United States Patent [19]

Tophinke

[11] Patent Number: 4,733,672

[45] Date of Patent: Mar. 29, 1988

[54] SEPARATING AND CLEANING ARRANGEMENT FOR A SELF-PROPELLED HARVESTER THRESHER

[75] Inventor: Franz Tophinke, Harsewinkel, Fed. Rep. of Germany

[73] Assignee: Claas Ohg, Harsewinkel, Fed. Rep. of Germany

[21] Appl. No.: 915,801

[22] Filed: Oct. 6, 1986

[30] Foreign Application Priority Data

Oct. 4, 1985 [DE] Fed. Rep. of Germany .... 3535427

[51] Int. Cl.$^4$ .............................................. A01F 12/00
[52] U.S. Cl. ................................. 130/27 T; 130/27 R
[58] Field of Search ........................... 56/320.1, 320.2; 130/27 T, 27 R

[56] References Cited

U.S. PATENT DOCUMENTS

| | | | |
|---|---|---|---|
| 3,995,645 | 12/1976 | Rowland-Hill | 130/27 T |
| 4,129,343 | 12/1978 | Janssen | 384/558 |
| 4,194,345 | 3/1980 | Pioch et al. | 56/320.2 |
| 4,198,802 | 4/1980 | Hengien et al. | 130/27 T |
| 4,248,249 | 2/1981 | Dunn et al. | 130/27 T |
| 4,312,421 | 1/1982 | Pioch | 56/320.1 |
| 4,344,442 | 8/1982 | Torland et al. | 130/27 T |
| 4,408,618 | 10/1983 | Witzel | 130/27 T |
| 4,659,240 | 4/1987 | Rogus | 384/145 |

Primary Examiner—Paul J. Hirsch
Attorney, Agent, or Firm—Michael J. Striker

[57] ABSTRACT

A separating and cleaning arrangement for a self-propelled harvester thresher, comprises a stationary housing extending in a traveling direction and provided with an inlet and outlet opening, and a rotor driveably supported in the housing and having a casing and a shaft surrounded by the casing and having two ends, and elements for supporting the rotor in the housing and including a bearing arranged on each of the ends of the shaft, a sleeve having a spherical outer surface and embracing the bearing which is arranged on one of the ends of the shaft being a front end as considered in a traveling direction, and a holder arranged so that sleeve is supported in the holder.

9 Claims, 3 Drawing Figures

SEPARATING AND CLEANING ARRANGEMENT FOR A SELF-PROPELLED HARVESTER THRESHER

BACKGROUND OF THE INVENTION

The present invention relates to a separating and cleaning arrangement for a self-propelled harvester thresher. More particularly, it relates to such a separating and cleaning arrangement which has a rotor drivingly supported in a housing fixedly mounted in the machine and provided with an inlet and outlet opening.

Separating and cleaning arrangements of the above mentioned general type are known in the art. The rotor of a known arrangement has a casing and a rotor shaft which is surrounded by said casing and has at its both ends a bearing which supports the rotor relative to the housing. The rotor of such harvester thresher must be dismounted in the event of required repair or maintenance works or removing of a coil winder. In every such case it is necessary to dismount both the front and the rear rotor shaft bearings with their holders. This is connected with high time consumption because of adherence of the agricultural product to these parts.

SUMMARY OF THE INVENTION

Accordingly, it is an object of the present invention to provide a separating and cleaning for a self-propelled harvester thresher, which avoids the disadvantages of the prior art.

More particularly, it is an object of the present invention to provide a separating and cleaning arrangement for a self-propelled harvester thresher in which a rotor shaft is supported so that the bearing at one rotor shaft end can be easily removed to mount and dismount the rotor in a very simple and easy way, and at the same time the mounting and dismounting can be performed by hand and the position of the rotor during this mounting and dismounting constantly changes.

In keeping with these objects and with others which will become apparent hereinafter, one feature of the present invention resides, briefly stated, in a separating and cleaning arrangement for a self-propelled harvester thresher in which the bearing provided at the front end of the rotor shaft, as considered in a traveling direction, is embraced by a sleeve with a spherical outer surface, and the sleeve is supported in a holder.

When the harvester thresher is designed in accordance with these features, it achieves the above mentioned objects.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
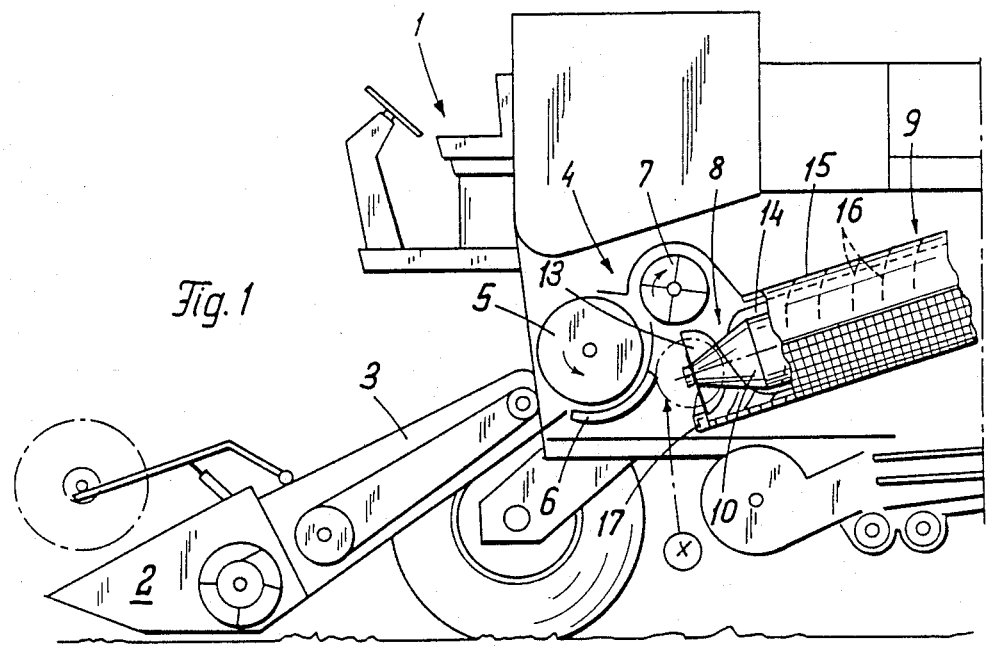
FIG. 1 is a view showing a front part of a self-propelled harvester thresher, on a side view, without one side wall.

A self-propelled harvester thresher is identified as a whole with reference numeral 1. It has a front cutting trough 2 which supplies a harvested product via an inclined conveyor 3 to a threshing arrangement. The threshing arrangement includes a threshing drum 5 which extends transversely to a traveling direction, and a threshing basket 6 which is associated with the threshing drum 5. A separating arrangement 9 is arranged downstream of the threshing arrangement 4 and operates in accordance with the principle of an axial flow. The straw which is at least partially threshed in the threshing arrangement 4 is supplied via a transferring drum 7 rotatable in clockwise direction, from above into an inlet opening 8 of the separating arrangement 9.

The separating arrangement 9 has a rotor which is identified as a whole with reference numeral 10 and extends in a traveling direction. The rotor has a shaft 11 which carries in its front region a conically extending casing 12. The casing 12 is provided in its conical region with pulling screw sheets 13. In its not-shown cylindrical region, the casing 12 is provided with strips 14. The rotor 10 is surrounded by a housing 15 which is provided with upper guiding and transporting ribs 16. A sieve is arranged under the same. The housing 16 is fixedly connected with a frame of the harvester thresher in its front region, for example via a traverse 17.

The traverse 17 has a small vertical web 18 which is welded on it. The web 18 has an end which faces away of the traverse 17 and carries a bearing cup 19. The bearing cup 19 is provided with a coating 20 of a synthetic plastic material, a soft metal or a similar material. A sleeve 21 is seated in the bearing cup 19. The sleeve 21 has a spherical outer surface which is convex outwardly and surrounds a roller bearing 22 arranged on a front end of the shaft 11 of the rotor. The position of the bearing 22 on the shaft 11 is secured by its abutment against a shoulder 24 and by a plate 26 which is tightened by a screw 25 against an end surface of the shaft 23.

Figure 2:
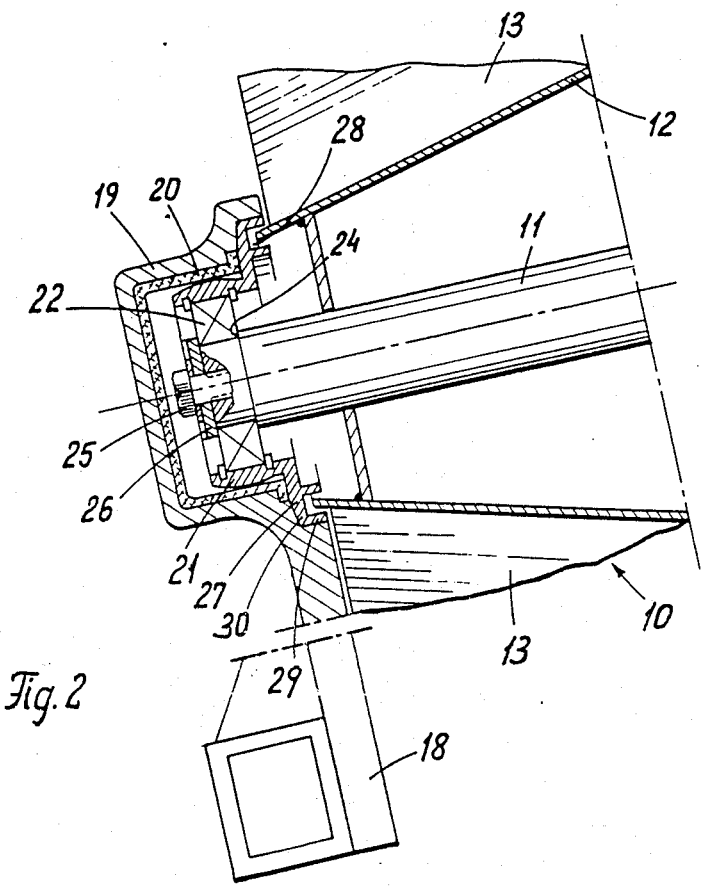
FIG. 2 is a view showing a fragment of the harvester thresher of FIG. 1, identified with X, on an enlarged scale.
Figure 3:
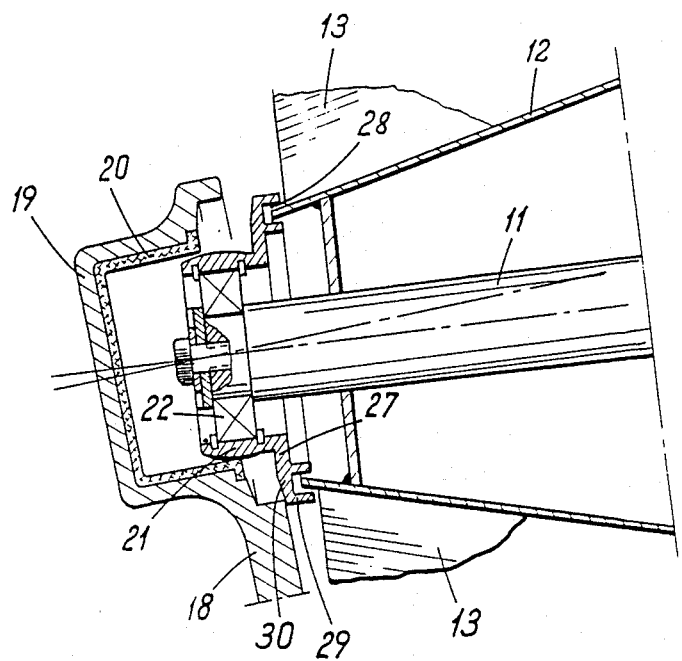
FIG. 3 is a view showing the fragment of FIG. 2 in a dismounted position.

As can be seen from FIGS. 2 and 3, the sleeve 21 has a collar-shaped projection 27 with an annularly extending groove 28. The front edge of the conically extending casing 12 engages in the groove 28 so as to provide a good sealing. The rear end of the shaft 11 is supported in a not-shown manner also in a bearing which for example is mounted on a web. After releasing the web, the bearing can be withdrawn from the shaft. Because of the formation of the bearing location in the front region of the rotor shaft, the entire rotor 10 can be withdrawn from the housing rearwardly. As shown in FIG. 3, since the sleeve 21 is spherical, it does not act in a damaging manner when during mounting or dismounting of the rotor 10 the center axes of the bearing cup 19 and the rotor 10 extend not completely coaxially, which cannot be avoided. Advantageously, the abutment point of the outer wall 29 with the bottom 30 of the annular groove is chamferred or rounded, so that the mounting of the rotor 10 is further facilitated.

It will be understood that each of the elements described above, or two or more together, may also find a useful application in other types of constructions differing from the types described above.

While the invention has been illustrated and described as embodied in a separating and cleaning device for a self-propelled harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A separating and cleaning arrangement for a self-propelled harvester thresher, comprising a stationary housing extending in a traveling direction and provided with an inlet and outlet opening; and a rotor driveably supported in said housing, said rotor having a casing and a shaft surrounded by said casing and having two ends; and means for supporting said rotor in said housing and including a bearing arranged on each of said ends of said shaft, a sleeve having an outer axially extending surface which is convexly spherical along its longitudinal length and also embracing said bearing which is arranged on one of said ends of said shaft being a front end as considered in a traveling direction, and a holder arranged so that said sleeve is supported with said outwardly convexly spherical outer surface in said holder.

2. A separating and cleaning arrangement as defined in claim 1, wherein said sleeve has a collar-shaped projection provided with an outer circumferential groove, said casing of said rotor having a front edge which is engaged in said groove of said collar-shaped projection.

3. A separating and cleaning arrangement as defined in claim 1, wherein said holder is stationary and cup-shaped, said holder having a location at which it is in contact with said sleeve and being provided in the region of said location with an elastic coating.

4. A separating and cleaning arrangement as defined in claim 3, wherein said coating of said holder is more elastic than steel.

5. A separating and cleaning device as defined in claim 1; and further comprising a stationary traverse, said holder being connected with said stationary traverse.

6. A separating and cleaning arrangement as defined in claim 5; and further comprising a small web which connects said holder with said stationary traverse.

7. A separating and cleaning device as defined in claim 2, wherein said collar-shaped projection has an outer wall and a bottom which limit said groove, said outer wall and said bottom forming an edge which is non-sharp.

8. A separating and cleaning device as defined in claim 7, wherein said edge formed by said outer wall and said bottom of said collar-shaped projection is rounded.

9. A separating and cleaning arrangement as defined in claim 7, wherein said edge formed by said outer wall and said bottom of said collar-shaped projection is chamferred.

* * * * *